United States Patent [19]

Buccioni

[11] Patent Number: 5,797,612
[45] Date of Patent: Aug. 25, 1998

[54] SPORTS EQUIPMENT CARRIER

[76] Inventor: Aldo Buccioni, R.R. 1, Palgrave, Ontario, Canada, L0N 1P0

[21] Appl. No.: 409,240

[22] Filed: Mar. 24, 1995

[51] Int. Cl.$^6$ .................................................. B62B 1/12
[52] U.S. Cl. .................... 280/47.26; 280/47.19; 280/638
[58] Field of Search .................. 280/8, 35, 638, 280/659, 47.17, 47.18, 47.19, 47.24, 47.26, 47.29, 47.35, 79.2, 814, 655.1

[56] References Cited

U.S. PATENT DOCUMENTS

| | | | |
|---|---|---|---|
| 2,106,503 | 1/1938 | Hendrick | 280/814 |
| 2,590,154 | 3/1952 | Burns | 280/47.19 |
| 2,784,999 | 3/1957 | Hunt | 280/47.35 |
| 2,905,480 | 9/1959 | Giovannelli | 280/659 |
| 2,918,297 | 12/1959 | Peters | 280/47.26 |
| 2,964,328 | 12/1960 | Muir | 280/47.19 |
| 3,145,031 | 8/1964 | Wilkinson | 280/47.35 |
| 3,241,750 | 3/1966 | Brighton | 280/47.26 |
| 3,460,850 | 8/1969 | Franklin | 280/47.26 |
| 3,779,568 | 12/1973 | Wakabayashi | 280/814 |
| 3,876,223 | 4/1975 | O'Reilly et al. | 280/47.19 |
| 4,418,930 | 12/1983 | Ryan, Jr. | 280/47.26 |
| 4,666,184 | 5/1987 | Garvey, Jr. | 280/814 |
| 4,842,289 | 6/1989 | Samuels | 280/8 |
| 4,848,782 | 7/1989 | Schmidt | 280/814 |
| 5,074,571 | 12/1991 | Reese | 280/47.19 |
| 5,244,220 | 9/1993 | Cortez | 280/47.26 |
| 5,551,562 | 9/1996 | Beretta | 280/47.26 |
| 5,570,895 | 11/1996 | McCue et al. | 280/47.19 |

Primary Examiner—Brian L. Johnson
Assistant Examiner—Frank Vanaman
Attorney, Agent, or Firm—Bereskin & Parr

[57] ABSTRACT

A carrier for hockey equipment includes a generally box-shaped container body which is moulded in a high-impact plastic material, and has a pair of wheels at its bottom rear edge. Clamps are provided on the back face of the container for frictionally retaining a pair of hockey sticks that can be used to manipulate the carrier on its wheels. The container has doors at the front, a lower one of which can be folded down to form a platform on which a hockey player can stand while changing. An upper door opens laterally. The two doors provide access to a number of wire baskets within the container body, for accommodating hockey equipment.

13 Claims, 5 Drawing Sheets

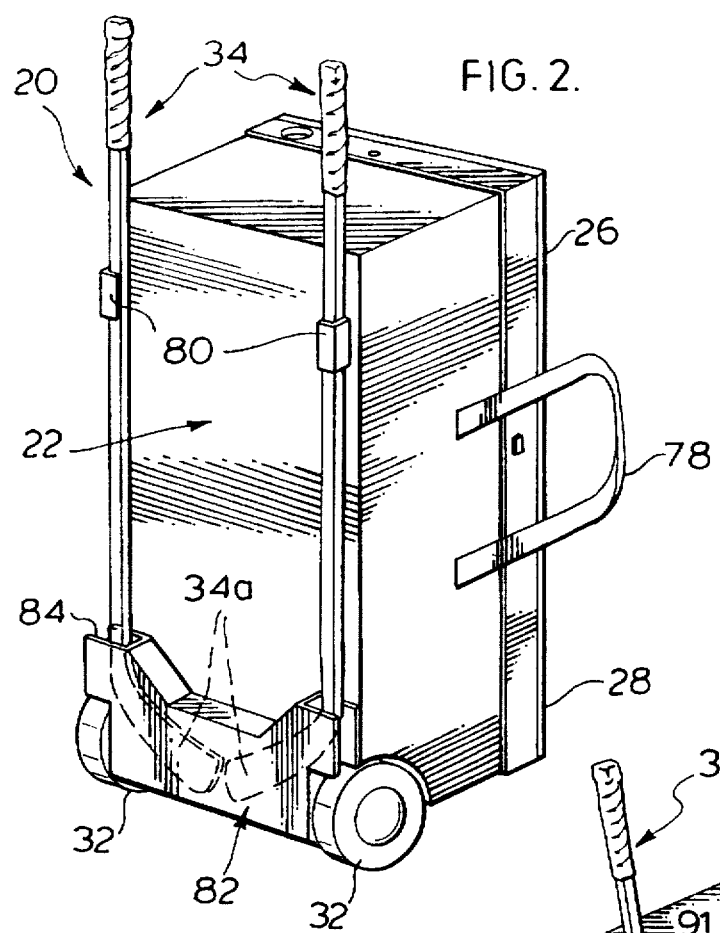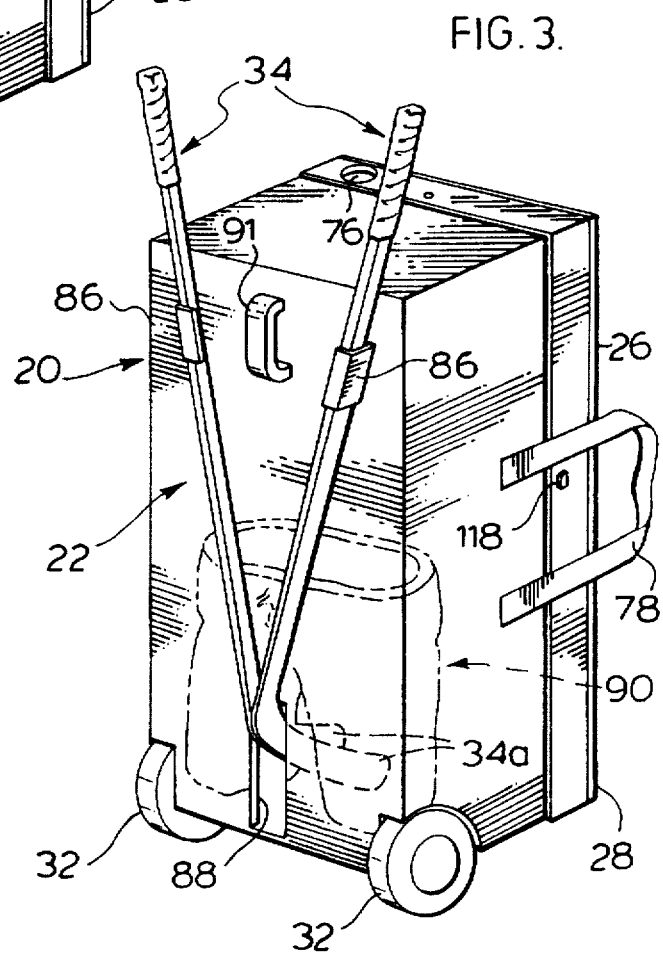

SPORTS EQUIPMENT CARRIER

FIELD OF THE INVENTION

This invention relates to a carrier for personal sports equipment such as ice hockey equipment.

BACKGROUND OF THE INVENTION

Ice hockey equipment tends to be quite bulky and difficult to transport. For example, each hockey player may require at least one pair of skates, a helmet, gloves, shoulder and shin pads, elbow pads, pants, shirt, undershirt, long underwear, and athletic support. A selection of two or three hockey sticks will also be required. Typically, the equipment, apart from the sticks, will be carried in a large nylon or canvas carry bag. The sticks will be carried separately. Not only is this an awkward method of transporting equipment but there are a number of other disadvantages. One is that it is very difficult to find a particular piece of equipment within the bag. It is necessary to rummage through all of the equipment. Often, the various pieces are taken out of the bag and strewn around while the player searches for the particular item that is needed.

Due to the very nature of a hockey game, much of the equipment becomes wet in use. In a conventional hockey bag, the equipment does not have an opportunity to dry out. Very few players bother to completely empty the bag when they get home. Items to be laundered may be removed and dealt with separately but the remaining equipment stays inside the bag and does not properly dry out. As a result, odours and mildew may develop within the bag. If that does happen, it is very difficult to clean the bag.

Dealing with hockey sticks is also a problem. It is quite difficult to carry a number of sticks as well as the bag. Typically, the player must negotiate doors, stairs, hallways, parking lots, car entry and exit carrying the bag and a bundle of sticks.

As far as is known, there has been no prior proposal to provide a mobile hockey equipment carrier in any form other than the bag described. U.S. Pat. No. 4,842,284 (Samuels) discloses a portable ski locker but the Samuels locker would not be suitable for hockey equipment in the manner envisaged by the present invention. Other examples of prior art patents considered in the preparation of this patent application are U.S. Pat. Nos. 5,244,220 (Cortez), 2,964,328 (Muir), and 2,905,480 (Giovannelli).

SUMMARY OF THE INVENTION

It is an object of the present invention to provide a carrier for sports equipment that addresses these shortcomings of the prior art. The carrier has been devised primarily in the context of hockey equipment but, in at least one aspect, may be used for other sports equipment.

Accordingly, in a first aspect of the invention, the carrier comprises an upright container which includes a container body having an internal space for receiving the equipment, an open front providing access to said space, and door means for closing said front. The container is provided at its lower end with ground wheels, and also has handle means by which the container can be manipulated and transported on the wheels. The door means comprises an upper door hinged at one side to the container body, for opening laterally, and a lower door hinged at a bottom edge to the container body and capable of being moved between a first position in which the door closes a lower portion of the open front of the container body, and a second position in which the door extends generally horizontally from the front of the container body for resting on a floor surface. The lower door has dimensions selected to permit the door to serve as a platform on which a user of the sports equipment can stand while dressing. The container is provided behind each of the upper and lower doors with at least one receptacle for sports equipment.

The container of the invention, will be sized to accommodate all of the equipment for one person. The container can be wheeled around and manipulated by the handle means. Awkward carrying is avoided, although some lifting may be necessary from time to time. At the location at which the equipment is to be used, the upper and lower doors can be opened to provide access to the equipment in the receptacle(s). The lower door acts as a platform on which the user of the equipment can stand while dressing and undressing. In the case of hockey arenas in particular, the floors in change rooms are often wet and cold. The platform provided by the invention allows the player to change in comfort while having all of the equipment in sight and readily available at hand.

In another aspect of the invention in which the carrier is designed specifically for hockey equipment, the carrier comprises a container which includes a container body having an internal space within the body for receiving the equipment, an open front providing access to the space and door means for closing the open front. Within the container body behind the door means, are a number of receptacles for hockey equipment. The container body has wheels at its lower end and is also provided with means for releasably securing to the container body a pair of hockey sticks in generally upright positions so that the sticks provide handle means by which the container can be manipulated and transported on said wheels.

In this aspect of the invention, not only are the hockey sticks used as handles for the carrier, but they are coupled to the container body and thereby transported together with the other equipment. It is not necessary to carry the sticks separately as is the case with a conventional bag. The sticks are always with the other equipment and therefore are unlikely to be mislaid.

This contrasts with a typical situation in which a hockey bag is used and the sticks are transported separately from the other equipment. In that case, as the players enter the dressing room, sticks tend to be deposited in one corner of the room, in a communal pile. It is then necessary for each player to sort through a relatively large number of sticks both at the beginning of the game and after the game as the players are leaving for home. Sticks belonging to different players are confused with one another, which leads to wasted time and sticks being misplaced. In contrast, with the carrier of the invention, a particular player's sticks are always with his or her other equipment.

BRIEF DESCRIPTION OF DRAWINGS

In order that the invention may be more clearly understood, reference will now be made to the accompanying drawings which illustrate a particular preferred embodiment of the invention by way of example, and in which:

FIG. 2 is a first perspective view from the rear as compared with FIG. 1 showing a first hockey stick securing methods;

FIG. 3 is a view similar to FIG. 2 showing an alternative hockey stick securing method;

DESCRIPTION OF PREFERRED EMBODIMENTS

Figure 1:
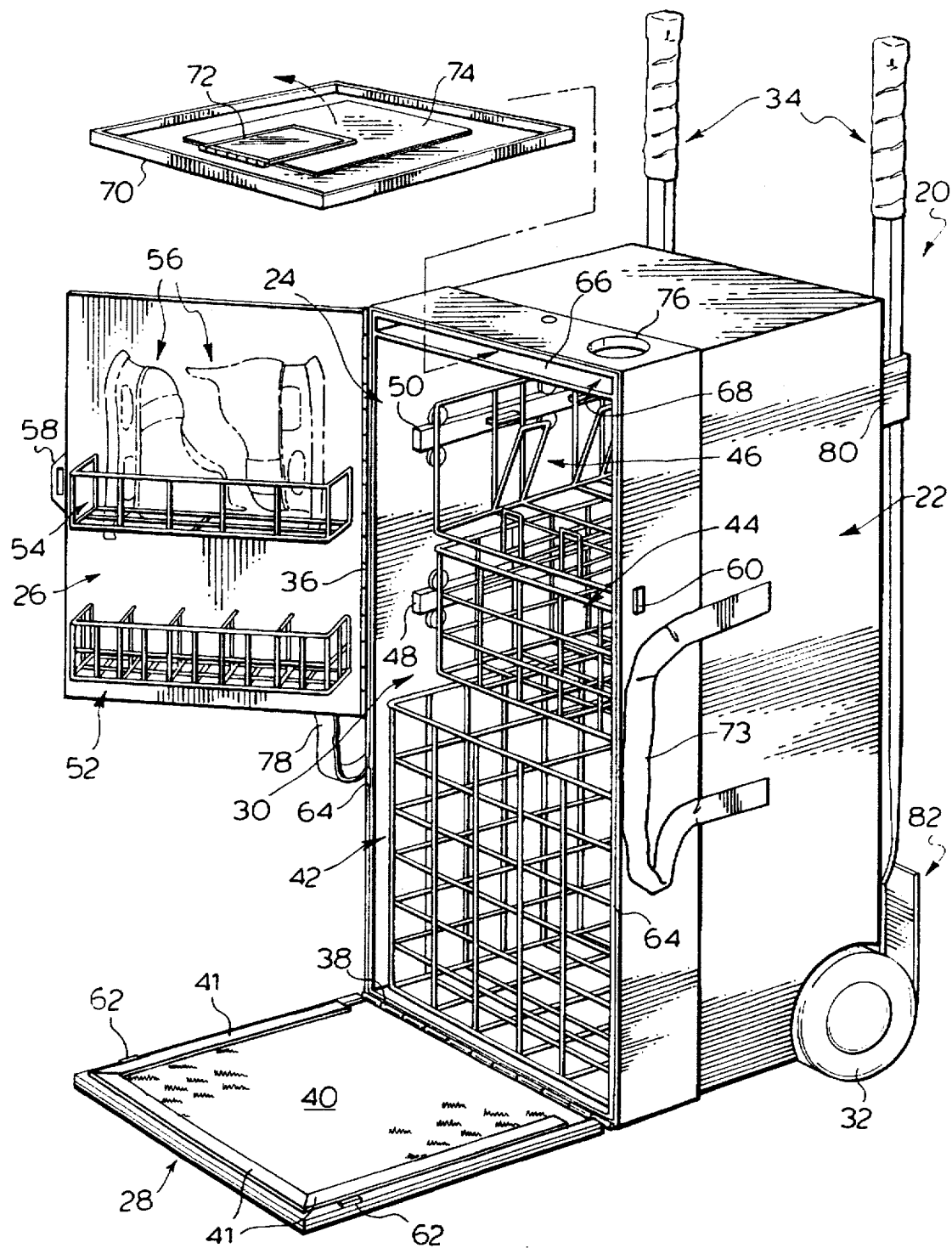
FIG. 1 is a front perspective view of a hockey equipment carrier in accordance with the invention, shown with two doors at the front of the carrier open, and a tray in an exploded position.

Referring first to FIG. 1, a hockey equipment carrier 20 is shown to comprise a rectangular box-shaped container of relatively tall elongate form including a container body 22 having a normally open front 24. Two doors 26 and 28 provide access to an internal space 30 within the container body for receiving the hockey equipment. The container is provided at a bottom rear corner with a pair of wheels 32, only one of which is visible in FIG. 1. A pair of hockey sticks 34 are releasably secured to the rear face (back) of the container body and serve as handles by which the container can be tilted rearwardly and then manipulated and transported on the wheels 32. In FIG. 1, the carrier is shown ready for use in a change room, with the bottom front edge of the container body resting on a floor or other support surface. The carrier is then stable.

Figure 6:
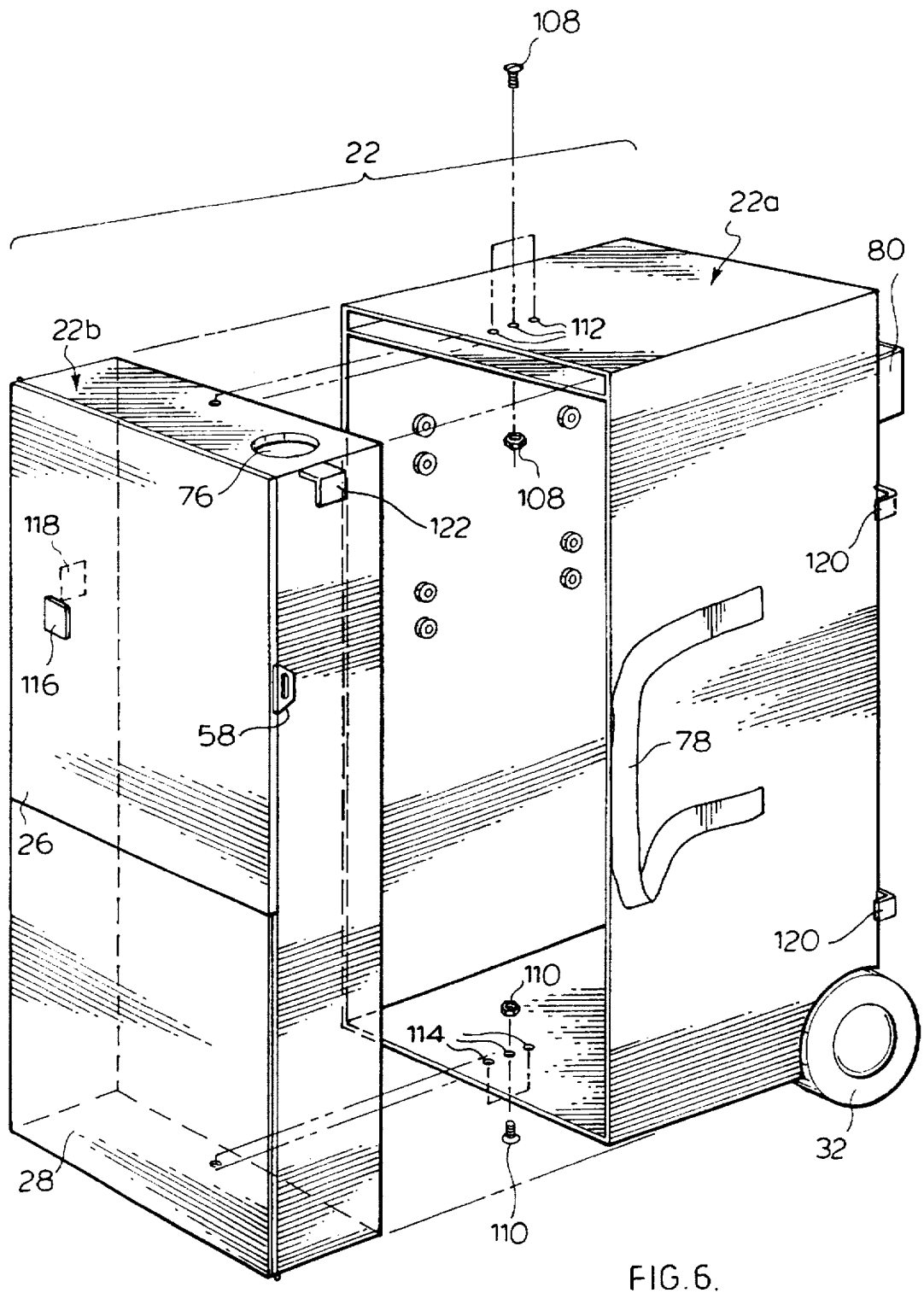

As can be seen, the upper door 26 is coupled to the container body 22 at one side by a piano-type hinge 36 while the lower door 28 is hinged at its bottom edge to the container body by a similar hinge 38. FIG. 6 shows the two doors in closed positions and it will be seen that they then co-operate to completely close the open front of the container body. Both doors are shown in open positions in FIG. 1. The lower door 28 extends generally horizontally from the front of the container body and rests on a floor surface. This door is relatively large (e.g. minimum 14"×14") so that it can serve as a platform on which a player can stand while dressing and undressing. The platform can also be used as a footrest. A square 40 of carpet is removably received in slideways 41 along three edges of door 28 and provides a comfortable, dry standing surface.

Figure 5:
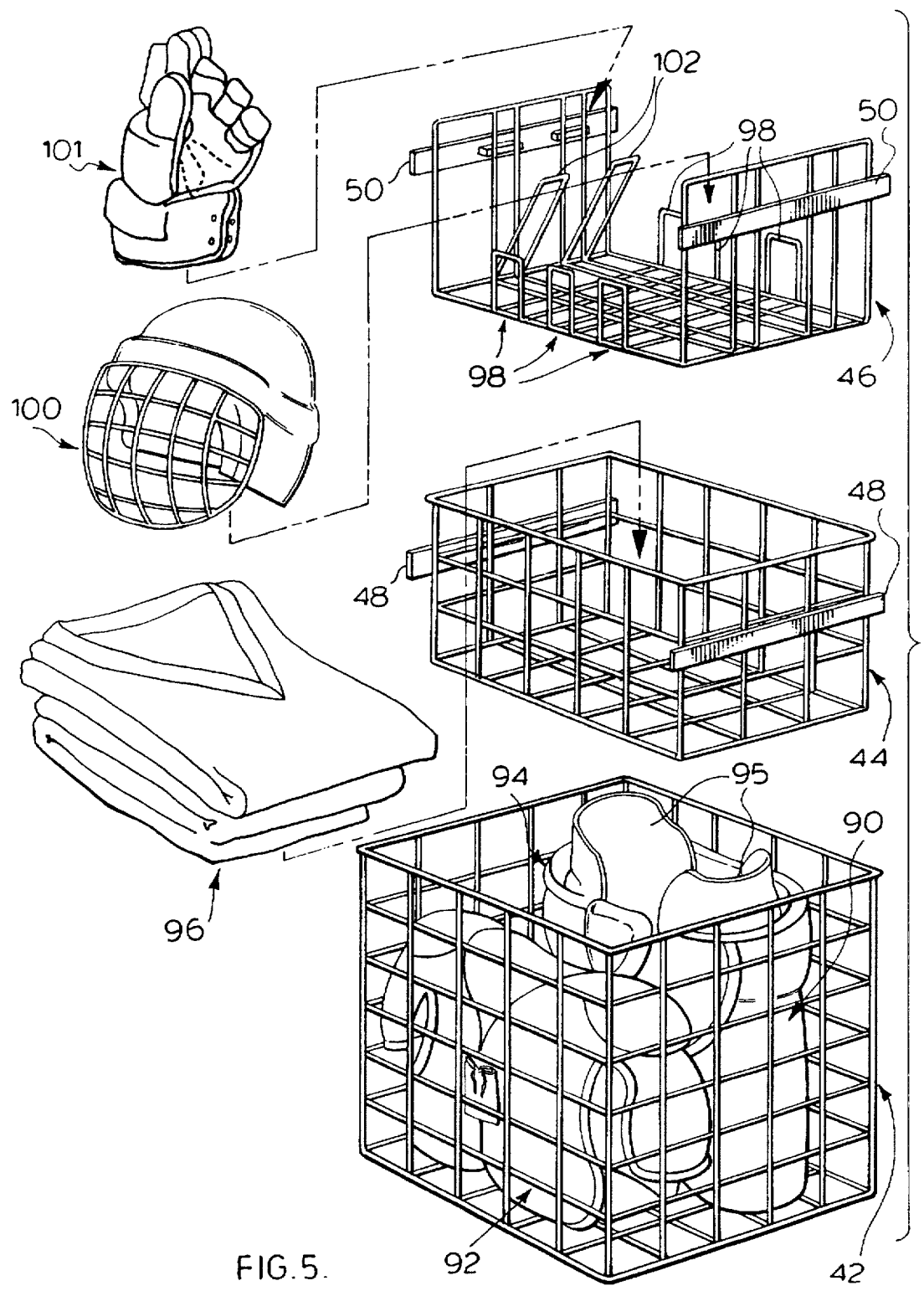
FIG. 5 is an exploded perspective view showing wire baskets of the carrier individually and in association with particular pieces of hockey equipment that may be carried within those baskets; and, FIG. 6 is a view similar to FIG. 1 illustrating a feature of the invention that permits the container of the carrier to be expanded.

A number of receptacles for hockey equipment are provided within the container body behind the doors, and are in the form of wire baskets. The baskets are slidably supported in the container body so that they can be pulled out, while remaining supported, to permit the player to select and remove appropriate pieces of equipment. In this particular embodiment, three wire baskets are provided and are denoted respectively 42, 44 and 46. The baskets are shown individually in FIG. 5, in association with particular pieces of equipment that might typically be carried in their respective baskets. FIG. 5 will be described in more detail later.

Reverting to FIG. 1, it will be seen that the two upper baskets 44 and 46 are carried on respective slides 48 and 50 within the container body, while the lower basket 42 is free-standing. It will also be seen that additional wire trays 52 and 54 are provided on the inner surface of the upper door 26. The upper tray 54 is specifically designed to hold a pair of hockey skates 56 lying flat against the inner surface of the door as shown, with the blades generally vertically oriented. The width of the tray selected to hold the skates relatively tightly against the door, with the blades extending through openings in the bottom of the tray. The lower tray 52 is designed to hold, for example, shampoo bottles, soap, and other personal care items (see FIG. 4).

The wire baskets 42, 44 and 46 and the trays 52 and 54 are plastic-coated for safety and to avoid rusting.

The container body, the doors 26 and 28 and the wheels 32 are moulded in a plastic material selected for high-impact resistance. The wheels are accommodated in respective recesses moulded into the bottom rear corners of the sides of the container body. A catch 58 is integrally moulded onto the outer edge of door 26 and engages a keeper 60 on the container body for holding the door in its closed position. Magnetic catches 62 and 64 are provided on the bottom door 28 and on container body 22 respectively for holding the bottom door closed.

FIG. 1 also shows that a shelf 66 is provided inside the container body at a spacing from the top of the body, selected to provide a slot 68 for receiving a removable tray 70. Tray 70 is provided with a flip-up dressing mirror 72 that can also be used to hold down papers such as schedules or other documentation relating to a hockey game. A circular opening 76 is provided in the top of the container body immediately above shelf 66 to act as a cup holder.

Carry straps 78 are provided on the respective sides of the container body for facilitating lifting of the carrier.

Referring now to FIGS. 2 and 3, two alternative methods of retaining the hockey sticks 34 on the back of the container body are shown. As seen in FIG. 2, the shafts of the respective sticks are frictionally engaged by clamps 80 moulded into the back surface of the container body. At the bottom of the body between the two wheels 32, a rearward moulded extension 82 of the container body provides respective slots 84 into which the blades 34a of the two sticks can be inserted towards one another as shown. The sticks are retained in this fashion in the carrier shown in FIG. 1.

In the arrangement of FIG. 3, on the other hand, friction clamps 86 similar to the clamps 80 are provided on the back of the container body but are angled so that the shafts of the sticks adopt a generally V-shaped configuration with respect to one another, and the blades 34a extend forwardly through a slot 88 in the rear wall of the container body and project forwardly into the space within the container body. FIG. 3 illustrates the fact that the blades can then be used to perform a support function in that the player's pants (denoted 90) can be positioned so as to in effect straddle the blades. The blades then assist in locating the shorts and restraining them against movement inside the container.

A small U-shaped handle 91 is provided on the back of the container body between the clamps 86. Handle 91 can also serve as a hook for "extra" items.

Figure 4:
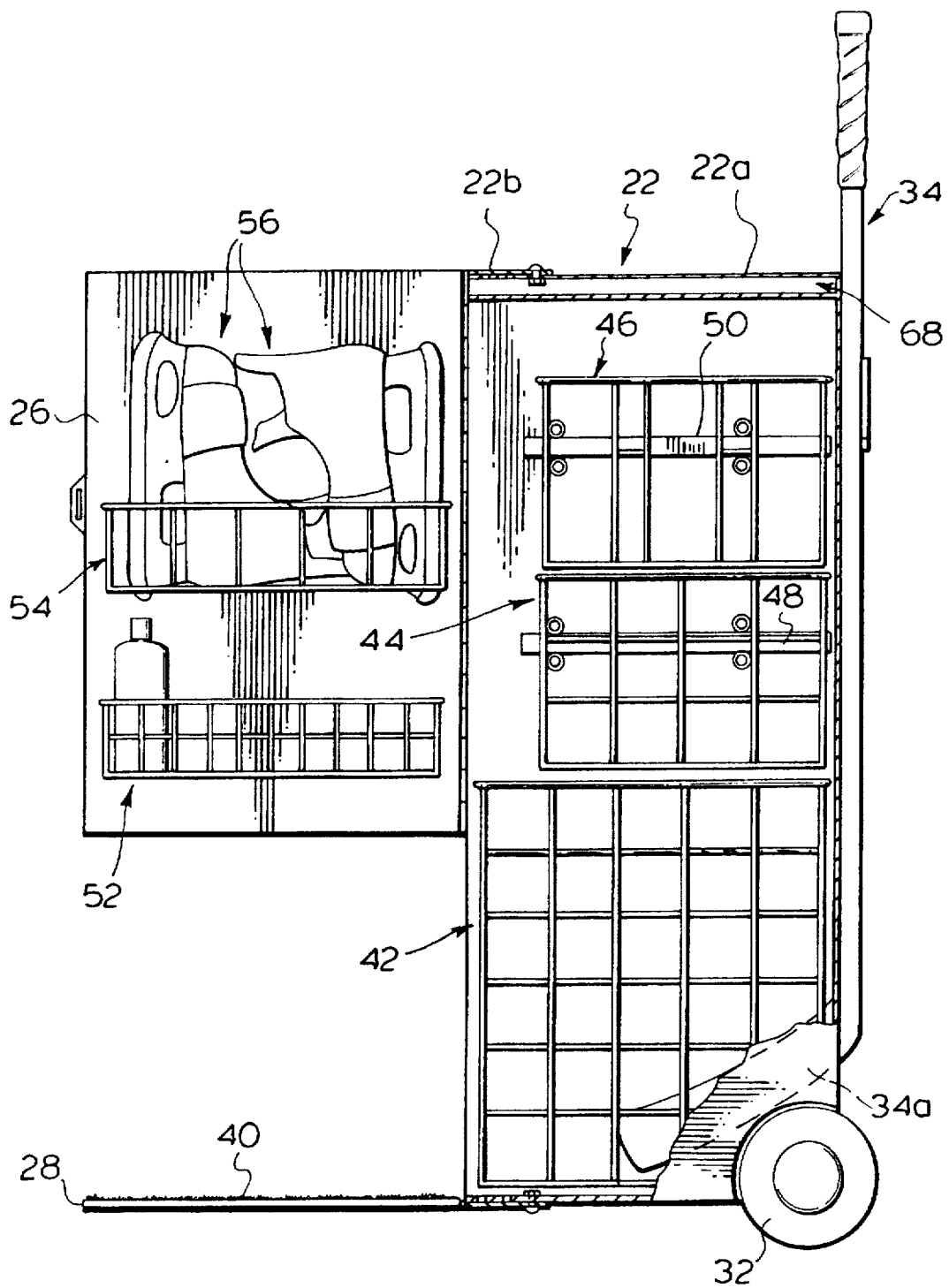
FIG. 4 is a vertical sectional view through a carrier of the type shown in FIG. 3.

FIG. 4 is a vertical sectional view through a carrier of the form shown in FIG. 3 and illustrates the blades of the sticks protruding forwardly as described.

Referring now to FIG. 5, the three wire baskets 42, 44 and 46 are shown generally in the positions that they occupy within the container body (FIG. 1). Basket 42 is a relatively large rectangular basket and is designed to accommodate the hockey pants 90 and shoulder pads 92 for the player. An opening (not shown) in the rear side of the basket 42 accommodates the blades 34a of the sticks as shown in FIG. 4. The player's athletic support is indicated at 94 wrapped around shin pads 95 that have been inserted into the leg holes of the pants.

Basket 44 is a smaller rectangular basket and is supported on the slides 48 referred to previously, inside the container body. This basket is designed to accommodate the player's clothing as indicated at 96.

The top basket is similar in size to the center basket 44 but has only small projections 98 at its front and rear sides, instead of complete sides. This basket is designed to accommodate the player's helmet 100 and gloves 101 (only one shown). A pair of inwardly angled wire elements 102 are specifically designed to support the gloves in positions for drying. Elbow pads (not shown) may also be accommodated in basket 46.

FIG. 6 illustrates the fact that the container body 22 is designed to be extendable for varying the front-to-back depth of the internal space within the container body. This allows the container, for example, to be expanded in size as a young hockey player grows and needs larger equipment. Looked at another way, the size of the container can be tailored to the requirements of the player. This is achieved by making the container body 22 in two parts, comprising a main rear part 22a and a smaller front part 22b that essentially comprises a rectangular frame dimensioned to be a close sliding fit around the outer front margin of the rear part 22a. The two parts of the container body are secured together by respective sets of bolts and nuts indicated at 108 and 110 that extend through aligned holes in the respective parts. It will be seen that a series of holes are provided in the rear part, as indicated at 112 and 114 to provide the required adjustment. The two doors 26 and 28 are of course carried by the outer body part 22b.

FIG. 6 also shows that a magnetic catch and keeper 116, 118 respectively are provided on the upper door and on the frame 104, for holding the upper door 26 in an open position.

A still further feature of the invention illustrated by FIG. 6 is the provision of L-shaped brackets 120, 122 for permitting the carrier to be, in effect, hooked onto the trunk lid of a car, for transportation of the carrier. Two of the brackets, denoted 120, are aligned along the vertical rear edge of the container body, at one side of the body, and are intended to be hooked over the rear edge of the trunk lid. The third bracket, 122, is disposed at the top edge of the container body at the same side and is designed to hook over one lateral side edge of the trunk lid. In use, the two brackets 120 would be engaged first with the trunk slightly open. The carrier would then be shifted laterally to engage the third bracket 122. Fully closing the trunk lid would then in effect trap the brackets and hold the carrier in place.

In summary, the illustrated embodiment of the invention provides a hockey equipment carrier and "organizer". When the doors (26, 28) are open and the baskets pulled out, the equipment is visible in an organized array and is fully exposed for drying. If a particular piece of equipment is missing, that fact is readily apparent. The carrier can also be used for "off season" storage of equipment.

It should of course be understood that the preceding description relates to particular preferred embodiments of the invention only and that many modifications are possible within the broad scope of the invention. For example, the container body need not be of the precise shape shown and need not be made of a plastic material. Similarly, different numbers, configurations and arrangements of baskets, trays or other receptacles could be used. The receptacles could be made of plastic, for example of relatively rigid mesh or open frame construction. Also, the provision for securing hockey sticks to the rear face of the container body could omitted, and the container body provided with some other form of handle for manipulating the container. This might be appropriate, for example, where the carrier is to be used for equipment other than hockey equipment.

I claim:

1. A hockey equipment carrier comprising an upright container which includes a container body having an internal space for receiving said equipment, an open front providing access to said space, and door means for closing said front, a lower end provided with ground wheels, at least one receptacle for hockey equipment within said internal space and accessible behind said door means, and means releasably securing to the container body a pair of hockey sticks in generally upright positions in which the sticks provide handle means by which the container can be manipulated and transported on said wheels.

2. A hockey equipment carrier as claimed in claim 1, wherein the door means comprises an upper door hinged to one side of the container body for opening laterally, and a lower door hinged to a bottom edge of said container body and capable of being moved between a first position in which the door closes a lower portion of the open front of the container body, and a second position in which the door extends generally horizontally from the front of the container body for resting on a floor surface, said lower door having dimensions selected to permit the door to serve as a platform on which a user of the sports equipment can stand while dressing and undressing.

3. A hockey equipment carrier as claimed in claim 2, wherein said upper door has an inner surface provided with at least one wire tray for accommodating hockey skates.

4. A hockey equipment carrier as claimed in claim 2, wherein said container has a rectangular box-shape with a height, a width and a depth, in which the height is greater than both the width and the depth, and wherein said wheels comprise a pair of wheels disposed at opposite sides of a lower rear corner of the box shaped container, whereby the container can be tilted rearwardly so as to be supported on said wheels, for transportation, or disposed in a stationary generally upright position on a floor or other support surface.

5. A hockey equipment carrier as claimed in claim 4, wherein said container is made of a plastic material having high impact resistance.

6. A hockey equipment carrier as claimed in claim 5, wherein said container has a rear face provided with said means for releasably securing to the container body a pair of hockey sticks, wherein said means for releasably securing includes a pair of clamps for frictionally engaging respective shafts of the pair of hockey sticks and holding said sticks against the rear face of the container.

7. A hockey equipment carrier as claimed in claim 6, wherein said means for releasably securing to the container body a pair of hockey sticks are arranged to hold the sticks in a V-configuration against said rear face of the container, with blades of the sticks extending forwardly through a slot in said rear face, and into said internal space within the container.

8. A hockey equipment carrier as claimed in claim 7, wherein said at least one receptacle for hockey equipment comprises a plurality of wire baskets received within said internal space in the container body, at least one of said baskets being slidably coupled to the container body so that it can be withdrawn therefrom for permitting access to hockey equipment within the basket, and wherein a lower one of said wire baskets is a free-standing basket and is provided with an opening to accommodate said stick blades, whereby said blades can be used for positioning equipment within said basket.

9. A hockey equipment carrier as claimed in claim 4, wherein said at least one receptacle for hockey equipment comprises a plurality of wire baskets received within said internal space in the container body, at least one of said baskets being slidably coupled to the container body so that it can be withdrawn therefrom for permitting access to hockey equipment within the basket.

10. A hockey equipment carrier as claimed in claim 4, wherein said container is provided with an internal shelf spaced downwardly from a top wall of the container for defining a space that receives a removable tray suitable for accommodating documentation.

11. A hockey equipment carrier as claimed in claim 4, wherein said container body is adjustable in depth and comprises a rear body part defining a top wall, a bottom wall, side walls, and a rear wall, and a front body part defining a frame which is slidably coupled to said rear body part for forming an extension of said top, bottom and side walls of said rear body part, said front body part being provided with said door means, and wherein the carrier further comprises means for adjustably coupling together said front and rear body parts in a number of positions in which the container has respectively different depths.

12. A hockey equipment carrier as claimed in claim 4 for use in combination with an automobile having a trunk lid, wherein the carrier further comprises means on a side of the container for clamping the carrier to said trunk lid, said means comprising first and second brackets projecting outwardly of said side of the container from a rear edge of the container body, for engaging a rear edge of the trunk lid, and a third bracket projecting outwardly of said side from one of a top edge and a bottom edge of the container body, for engaging a side edge of the trunk lid.

13. For use in combination with a pair of hockey sticks, a hockey equipment carrier comprising an upright container which includes a container body having an internal space for receiving said equipment, an open front for providing access to said space, and door means for closing said front, a lower end provided with ground wheels, at least one receptacle for hockey equipment within said internal space and accessible behind said door means, and means for releasably securing said pair of hockey sticks to the container body, said means for releasably securing being adapted to secure the pair of hockey sticks in generally upright positions in which the sticks extend above the container body and provide handle means by which the container can be manipulated and transported on said wheels.

* * * * *